United States Patent [19]

Grunke

[11] 4,159,357

[45] Jun. 26, 1979

[54] PROCESS FOR SURFACE TREATING PARTS MADE OF CERAMIC MATERIAL

[75] Inventor: Richard Grunke, Munich, Fed. Rep. of Germany

[73] Assignee: Motoren- und Turbinen-Union Munchen GmbH, Munich, Fed. Rep. of Germany

[21] Appl. No.: 838,599

[22] Filed: Oct. 3, 1977

Related U.S. Application Data

[63] Continuation-in-part of Ser. No. 666,094, Mar. 11, 1976, abandoned.

[30] Foreign Application Priority Data

Mar. 13, 1975 [DE] Fed. Rep. of Germany ....... 2510938

[51] Int. Cl.$^2$ .............................................. B05D 3/02
[52] U.S. Cl. .................................... 427/250; 427/255; 427/294; 427/376 A; 427/380; 427/383 B; 427/399
[58] Field of Search ................... 427/255, 380, 248 E, 427/376 A, 399, 383 B, 372 A, 250, 294; 428/539, 446

[56] References Cited

U.S. PATENT DOCUMENTS

| | | | |
|---|---|---|---|
| 1,818,904 | 8/1931 | Martin | 427/376 A X |
| 3,012,902 | 12/1961 | Bayer | 427/399 X |
| 3,047,424 | 7/1962 | Suchoff | 427/380 X |
| 3,063,865 | 11/1962 | Baer et al. | 427/250 X |
| 3,215,555 | 11/1965 | Krey | 427/380 X |
| 3,450,574 | 6/1969 | Read | 427/255 |

FOREIGN PATENT DOCUMENTS 510998 1955 Canada .................................. 427/383

OTHER PUBLICATIONS

*Handbook of Chemistry and Physics,* 47th Ed., Cleveland, Ohio, The Chemical Rubber Co., 1966, p. B-149.

*Primary Examiner*—Evan K. Lawrence
*Attorney, Agent, or Firm*—Alan H. Levine

[57] ABSTRACT

A process for surface treating ceramic parts so as to increase their resistance to oxidation when exposed to high temperatures. The process includes applying a metal coating to the ceramic part, and thereafter heating the part to form a glass surface layer with the metal oxide built into the lattice of the glass layer. The metals employed may be aluminum, magnesium, titanium, lead, zinc, cadmium, or rare-earth elements. The heat treatment is performed in more than one stage.

6 Claims, No Drawings

PROCESS FOR SURFACE TREATING PARTS MADE OF CERAMIC MATERIAL

This is a continuation-in-part of application Ser. No. 666,094, filed Mar. 11, 1976, abandoned.

BACKGROUND OF THE INVENTION

This invention relates to a process for the surface treatment of structural parts, working parts, or the like, made from a ceramic material, which are to be exposed to relatively high temperatures.

An example of the use of a ceramic material at high temperatures is in a gas turbine made of a ceramic material, and whose component parts such as blades, distributor, combustion chamber, nozzle cone, etc. are exposed to temperatures in the range of 1400° C. when in operation.

It has now been established that ceramic materials, such as silicon nitride ($Si_3N_4$) or silicon carbide (SiC), oxidize on the surface at temperatures starting from about 800° C., thus forming a glass layer which, depending on the chemical composition, slows down further oxidation because it has a retarding effect on the supply of oxygen to the base material thereunder. The aforementioned chemical composition of the surface glass layer is essentially determined by impurities in and/or additions to the ceramic base material.

In the case of a porous ceramic material, e.g., reaction-sintered silicon nitride, further oxidation produces particularly unfavorable results, since the oxygen has free access to the base material through the pores, so that the material is oxidized to a very large extent, or even entirely, and thus becomes useless.

Efforts have been made to improve the resistance to oxidation of ceramic parts by avoiding, during production and to the extent possible, the inclusion of impurities in the base material. However, thus far such measures have not led to any satisfactory results. Moreover, the use of sintering auxiliary agents, such as calcium, is of fundamental importance to the production of ceramic materials; however, use of such agents causes the resistance to oxidation to be substantially reduced.

SUMMARY OF THE INVENTION

An object of the present invention is, therefore, to provide a new process for the surface treatment of ceramic materials which ensures that in subsequent utilization of the ceramic parts at high temperatures oxidation is substantially entirely prevented.

This objective is achieved, according to the invention, by applying to a ceramic working part a layer consisting of a metal, the oxide of which can be built into the lattice of the $SiO_2$-glass, in order to increase the resistance to oxidation of the ceramic working part. The application is accomplished by vapor deposition, or by other means, and the working part subsequently undergoes a multiple-stage heat treatment.

Such a layer may, for instance, be applied to the ceramic part in a high vacuum. The subsequent heat treatment preferably consists of several, different, successive phases of treatment. An effective protective layer can very easily be prepared from aluminum, magnesium, or titanium. Metals such as lead, zinc, cadmium, and rare-earth elements, such as lanthanum and yttrium, are useful as well.

The ceramic part bearing the metal coating is first heated to a temperature just below the melting point of the metal so as to oxidize the metal. This heat treatment should continue for at least about two hours. Thereafter, the ceramic part should be heated for at least about one day at 1300° C. to form a glass coating on the part with the metal oxide built into the lattice of the glass layer. More specifically, while the glass layer is being formed, its lattice is broken up, such as by sodium ions. The separations in the glass lattice are closed by building in the metal oxide.

DESCRIPTION OF THE PREFERRED EMBODIMENT

In the case of aluminum, for instance, a first thermal treatment phase may be performed at a temperature of about 640° C., which is just below the melting point of aluminum (660° C.), for at least about two hours, and a second treatment performed, for example, at a temperature of about 1300° C. for at least about one day. Each molecule of $Al_2O_3$ built into the lattice of the glass layer replaced two molecules of $SiO_2$.

It has been found that, when working with sufficiently high temperatures, a glass layer is formed on the surface of the ceramic parts or the like which prevents, or at least greatly reduces, further oxidation.

EXAMPLE

An aluminum layer was applied by means of vapor deposition in a high vacuum to the surface of a turbine blade consisting of reaction-sintered silicon nitride. This part was subsequently heat treated for 2 hours at 640° C. A further heat treatment was carried out at 1300° C. for about 1 to 2 days. As a result, a glass layer was formed on the turbine blade with an aluminum oxide layer built into the lattice of the glass layer.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A process for surface treating parts made of silicon-base ceramic material so as to increase the resistance of such parts to oxidation when they are exposed to high temperatures, the process comprising the steps of:
   (a) applying a single layer metal coating to the surface of a silicon-base ceramic part, the metal being one whose oxide can be built into the lattice of $SiO_2$, and
   (b) thereafter subjecting the ceramic part to a two-stage heat treatment,
      (I) the first stage of the heat treatment comprising heating the coated ceramic part at a temperature just below the melting point of the coating metal for at least about two hours so as to oxidize the metal, and
      (II) the second stage of the heat treatment comprising heating the part at a temperature of about 1300° C. for at least about one day, so as to form an $SiO_2$ glass surface layer on the part with a metal oxide built into the lattice of the glass layer.

2. A process as defined in claim 1 wherein the metal coating is applied to the ceramic part by vapor deposition.

3. A process as defined in claim 2 wherein the vapor deposition is performed in a vacuum.

4. A process as defined in claim 1 wherein the first stage of heat treatment is performed at a temperature lower than the temperature of the second stage.

5. A process as defined in claim 1 wherein the metal used to coat the ceramic part is selected from the group consisting of aluminum, magnesium, and titanium.

6. A process as defined in claim 1 wherein the metal used to coat the ceramic part is selected from the group consisting of aluminum, magnesium, titanium, lead, zinc, cadmium, and rare-earth elements.

* * * * *